Oct. 8, 1935.   R. L. HASCHE   2,016,860
APPARATUS FOR PLASTIC MOLDING
Filed Aug. 6, 1934
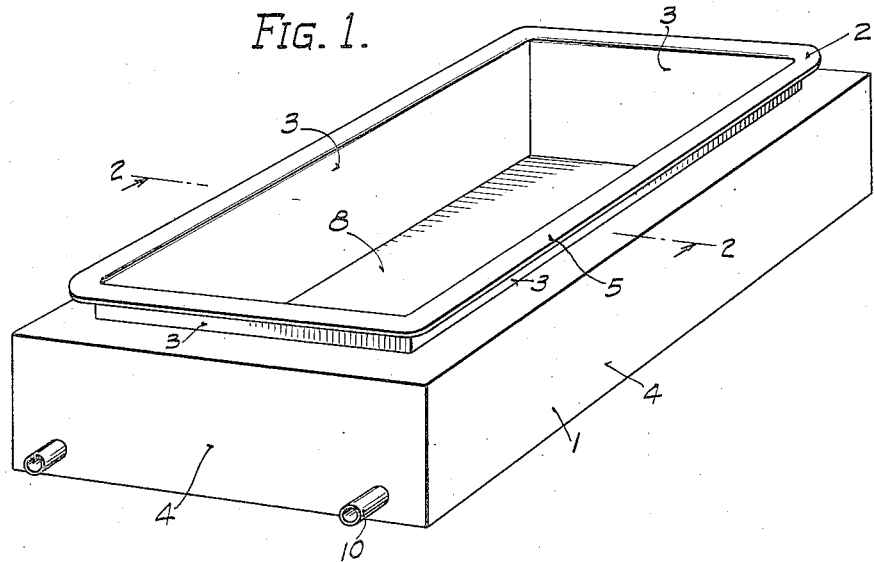
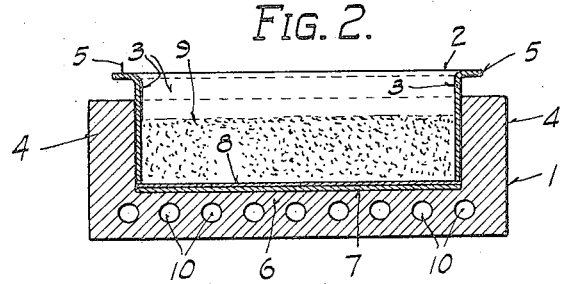
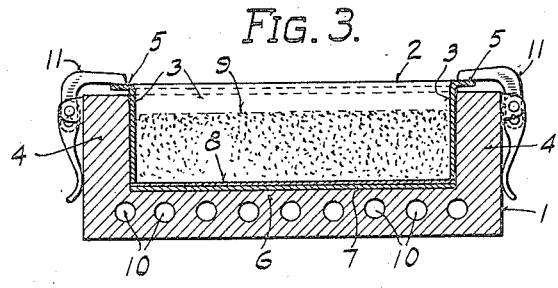
INVENTOR.
Rudolph L. Hasche
BY
ATTORNEY.

Patented Oct. 8, 1935

2,016,860

UNITED STATES PATENT OFFICE 2,016,860

APPARATUS FOR PLASTIC MOLDING

Rudolph L. Hasche, Whitefish Bay, Wis., assignor to A. O. Smith Corporation, Milwaukee, Wis., a corporation of New York Application August 6, 1934, Serial No. 738,601

4 Claims. (Cl. 18—30)

This invention relates to the art of plastic molding.

An object of the invention is to provide apparatus for charging sheet material and molding powder into molding dies for the production of composite slabs having a body formed of molding powder and a surface formed of sheet material.

Other objects of the invention will be clear from the following description and the accompanying drawing in which:

Figure 1 is a perspective view of one embodiment of my invention;

Fig. 2 is a vertical section on the line 2—2 of Fig. 1; and

Fig. 3 is a vertical section through another embodiment of the invention.

For certain purposes it is desirable to produce flat plates or slabs from resinous materials. While such slabs can be molded entirely from a molding powder compounded from a filler material and thermo-setting resins such as the phenol-formaldehyde resins or other resins of similar properties, it is frequently desirable to provide the plate or slab with a surface formed from a resin of higher quality than the resin which is used in the body of the slab. This can be done by using for the surface of the slab a sheet of paper or other material impregnated with the resin which it is desired to have on the surface of the slab.

Inconvenience has been experienced, however, in charging the molding die with the surface sheet and the molding powder which is to form the body of the slab. When the surface sheet is simply placed in the bottom of the die, and the molding powder is charged over it, it is difficult to prevent some of the molding powder from getting below the surface sheet where it detracts from the quality of the finished article.

This difficulty is avoided by the method of the invention which utilizes a simple and inexpensive charging frame to facilitate the introduction of the charge into the die. Referring to the drawing, Fig. 1 is a perspective view and Fig. 2 a sectional view of a die and one embodiment of a charging frame suitable for use in connection with a rectangular die 1 for pressing rectangular slabs. The charging frame 2 which is used to prevent the molding powder from getting under the surface sheet fits within the molding die 1 and has sides 3 which confine the molding powder within the limits of the frame. The frame is open at the top and bottom. It is generally desirable that the charging frame be of such dimensions as to fit quite closely to the walls 4 of the molding die 1. The frame may desirably be made of lightweight sheet metal and is provided with a flange 5 to give it stiffness. The flange should preferably be of sufficient width to extend beyond the inside dimensions of the molding die, because when of this width it not only stiffens the charging frame but also serves as a screen to prevent molding powder from dropping into the space between the outside of the charging frame and the inside of the die.

In using this device, the inside of the die is first cleaned. The slab may be formed by pressing the lower surface in contact with the bottom 6 of the die 1, but it is usually preferable to place on the bottom of the die a thin sheet 7 of stainless steel or similar material which has been highly polished. When such a sheet is used, it is placed in the die with the polished face up in order that it may be in contact with the lower face of the slab which is to be molded. Upon this there is placed the surface sheet 8 of resin-impregnated paper or other similar material. This sheet should fit closely to the walls of the die. It is to be understood that one or more sheets may be used if desired. After the surface sheet or last sheet of resin-impregnated paper, if more than one sheet is used, has been placed in position, the charging frame 2 is introduced into the die where it holds down the edges of the surface sheet 8, or sheets.

Molding powder 9 is then placed inside the charging frame in the desired quantity and is leveled off to form a layer of substantially uniform thickness. The molding powder which is charged within the frame may be all of one kind, or layers of different molding powders may be used. As is apparent from Fig. 2, the charging frame forms a complete seal around the edges of the surface sheet and prevents any molding powder from getting under the surface sheet while the powder is being introduced into the die. After the molding powder has been charged, its weight holds down the surface sheet and the charging frame can then be withdrawn from the die.

The charged die is then subjected to heat and pressure exerted by a plunger which is not shown in the drawing. The die and plunger are provided with channels for the introduction of steam or other heating medium to heat the resins in the surface sheet and the molding powder and to cause them to cure or set while under the pressure exerted by the plunger. Suitable channels for the heating and cooling of the die are shown at 10.

The invention is not confined to use with rectangular dies, but may be used with dies of other shape, and the frame may be left in the die until after the slab is molded. In the described embodiment illustrated in Figs. 1 and 2, the charging frame is withdrawn from the die before the charge of molding powder is compressed by the action of the plunger. Fig. 3 shows a vertical section through another embodiment in which the charging frame after being inserted in the die is locked in position by suitable means 11. The plunger which is used in this case is of such size as to fit closely inside the charging frame. The slab is pressed and heated before the charging frame is removed from the die. For some applications, the second embodiment may be preferable to that which is first described.

Other modications can be made without departing from the spirit of the invention.

I claim:

1. A device for loading a molding die consisting of an open ended frame which comprises sides that fit within the die and a flange adapted and arranged to stiffen the frame and cover the space outside the frame and inside the die, thereby preventing material from falling into said space.

2. A device for loading a molding die consisting of an open ended frame which comprises sides adapted and arranged to conform to the walls of the die.

3. In combination, a molding die for molding composite articles from sheet material and molding powder, and an open ended frame adapted and arranged to rest upon sheet material placed in the bottom of the die and prevent molding powder from getting under said sheet material.

4. A device for use in charging molding powder above sheet material in the bottom of a molding die which comprises an open ended frame adapted and arranged for holding the border of the sheet material in intimate contact with the bottom of the die.

RUDOLPH L. HASCHE.